A. JOHNSTON.
Cutting-Off Tool for Metal-Screw Machines.

No. 224,543. Patented Feb. 17, 1880.

Witnesses:
C. J. Hedrick
Philip Mauro

Inventor:
Allen Johnston
by A. Pollok
his attorney.

UNITED STATES PATENT OFFICE.

ALLEN JOHNSTON, OF OTTUMWA, IOWA.

CUTTING-OFF TOOL FOR METAL-SCREW MACHINES.

SPECIFICATION forming part of Letters Patent No. 224,543, dated February 17, 1880.

Application filed November 1, 1879.

*To all whom it may concern:*

Be it known that I, ALLEN JOHNSTON, of Ottumwa, Wapello county, Iowa, have invented a new and useful Improvement in Cutting-Off Tools for Screw and other Machines, which improvement is fully set forth in the following specification.

This invention relates to a cutting-off tool adapted to be used in connection with the revolving turret of a machine for the manufacture of screws or other articles of metal. In this class of machines the wire or rod from which the screw or other article is made is held in a revolving chuck, and the die and other tools are placed in a turret, which revolves to bring the tools successively into position in line with the wire or rod held by the chuck. Besides its motion of revolution, the turret has a back-and-forth motion, which brings the tool into action and releases it from the screw or other article.

Heretofore the tool for cutting off the screw or other article has not been adapted to be used in connection with a turret; but it is placed on an independent slide having a motion across the axis of the revolving chuck. It is very desirable to use a cutting-off tool which can be placed in the turret and operated by the movement thereof without requiring additional mechanism.

The production of such a tool is mainly the object of this invention, which consists in the new cutting-off tool adapted to be held and used in a turret; and, further, in the construction and combination of parts thereof, as hereinafter more fully set forth.

At the outer or front end of the tool a slide carrying the cutter moves across the axis of the tool, this movement being effected by contact of the tool with and pressure against a suitable stop. The slide is held in a reciprocating piece which is capable of movement longitudinally in the body of the tool, and this movement is communicated to the slide carrying the cutter through the medium, preferably, of a bent lever pivoted to the reciprocating piece, one arm of which engages in an opening in the body of the tool and the other in a slot in the slide. Other means could be used. Contact with the stop produces movement of the slide in one direction, and a spring is employed to return it. A face-plate holds the work firmly to the tool.

The following description will enable those skilled in the art to which it appertains to make and use my said invention, reference being had to the accompanying drawings, which form a part of this specification.

Figure 1:
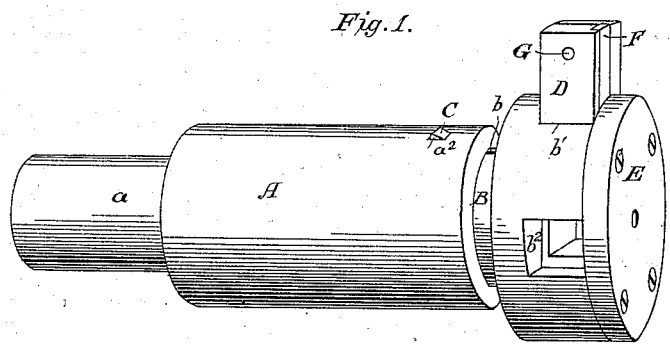
Figure 2:
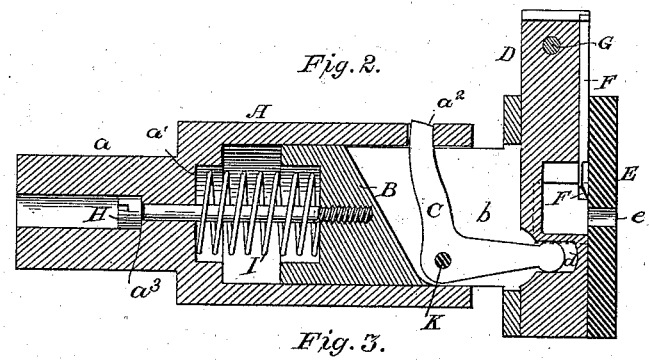
Figure 3:
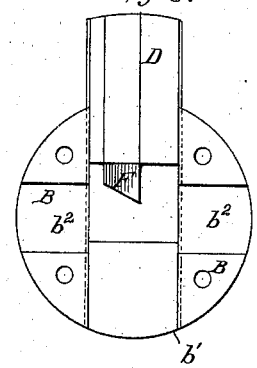

Figure 1 is a perspective view of the tool; Fig. 2, a longitudinal section, and Fig. 3 a front view with face-plate removed.

The same letters indicate like parts where they occur in all the figures.

A is the body of the tool, which carries the working parts thereof. At the rear end it is turned off at $a$ to a smaller diameter, in order to fit in a hole in the turret, so as to be held therein. Its interior is hollow, and near the rear end is a ledge or projection, $a'$.

B is a reciprocating piece, the rear end of which is of smaller diameter than the front part, and conforms to the interior of the body A, so that the piece B is free to move therein within certain limits. It is slotted, as indicated by $b$, and at $b'$ is a groove, preferably dovetailed, which extends across the axis of the tool. An opening, $b^2$, extends across the tool at right angles to the groove $b'$.

C is an angle-lever located in the interior of the piece B, and pivoted thereto by a pin, K. Of this lever one arm projects through the slot $b$ into a hole, $a^2$, in the walls of the body A. Its other arm engages with the opening $d$ in the slide D, which is free to move in the groove $b'$ in the piece B, and which carries the knife or cutter F.

The slide D is preferably made of a single piece of metal, split at one end and recessed upon the upper surface to receive the cutter F. A single screw, G, serves to clamp the latter and hold it firmly. The middle portion of the slide is removed, as shown.

E is a face-plate, having a central perforation, $e$. It covers the front end of the piece B.

I is a spring contained in the body A, of which one end rests upon the ledge or projection $a'$ and the other bears against the piece B. The outward movement of the latter is limited by the screw H, which is inserted from the rear and screwed into the piece B, and the head of which comes into contact with a projection, $a^3$, on the interior of the body A. The rear end of the piece B is preferably recessed, as shown, to receive the end of the spring.

In order to put the several parts together, the cutter F is secured in the slide D and the latter inserted in the groove $b'$. The lever is then placed in the slot $b$ and secured by the pin K. The face-plate is screwed down either before or after the insertion of the slide in its groove. The piece B is then inserted in the body A, the spring I being first placed in position and secured by the screw H. In inserting the piece B in position the lever-arm which projects through the hole $a^2$ is drawn back sufficiently to pass within the body A.

In order more clearly to explain the operation of the tool, reference is made to my former patent, No. 211,911, dated February 4, 1879, in which a screw-machine is described in connection with which the tool may be employed, the mechanism shown for cutting off the screw being dispensed with. The cutting-off tool is placed in the turret, and the latter, turning, brings it in line with the axis of the chuck. The turret then moves forward, the wire or rod held in the chuck enters the opening $e$, and the face-plate coming in contact with the jaws of the chuck, the piece B is moved backward in the body of the tool, and the lever C is turned by reason of the engagement of its arm with the hole, and the slide D is moved by the other arm of the lever across the axis of the tool, so that the edge of the cutter comes in contact with the wire or rod and cuts off the screw or other article, which is removed from the tool through the opening $b^2$.

Instead of operating the tool by contact of the chuck, any other suitable part of the machine could be used as a stop, or a special stop could be provided, if desired.

The plate E serves as a guide to hold the work firmly up to the tool while it is being acted upon. When the turret moves back the spring I returns the piece B and slide D to their first position. The screw H serves to adjust the slide, so that in its normal position the edge of the cutter has only a short distance to move before coming in contact with the wire.

The angle-lever C serves to impart the necessary translatory movement to the slide D; but other means could be used in place thereof, as an inclined plane, a pin working in a groove, or other devices; but the angle-lever is preferred.

I have referred to my former patent simply for the sake of clearness. The tool could be equally well employed with other machines having a turret or some equivalent therefor, of which there are many now known and used.

It is obvious that the length of the tool should be such that when the turret is at its greatest forward limit there shall be sufficient room for it between the turret and the stop.

It is obvious that my invention could be used to cut an annular groove in a wire by adjusting the cutter so that it does not cut the wire entirely through, but only to the depth desired.

Modifications may be made in the details of construction. For example, the plate E might be made of several parts instead of one. The cutter may be of any ordinary or suitable form.

Having thus fully described my said invention and the manner in which the same is or may be carried into effect, what I claim, and desire to secure by Letters Patent, is—

1. A cutting-off tool adapted to be held in and used in connection with a revolving turret of a screw-machine or similar tool-holding device, and to operate automatically by pressure against a stop, substantially as described.

2. A cutting-off tool adapted to be held in the turret of a screw-machine or similar tool-holding device, having a slide for carrying the cutter arranged at its outer or front end, and combined with mechanism, substantially as described, for effecting the movement of said slide across the axis of the tool.

3. The combination, with the body of the tool, of the reciprocating piece carried by and movable lengthwise of said body of the tool-cutter-carrying slide moving in a groove in said reciprocating piece, and means, substantially as described, for communicating the motion of the reciprocating piece in a direction lengthwise of the tool to the said slide in a direction across its axis, as set forth.

4. The combination of the body of the tool-reciprocating piece having a longitudinal movement with respect thereto, a cutter-carrying slide, and an angle-lever, substantially as described.

5. The combination, with the body of the tool, of the reciprocating piece having a movement lengthwise of said tool, the cutter-carrying slide, and mechanism, as described, for communicating the movement of the said piece with reference to the tool-body to the slide of the spring, arranged to return the said piece and slide to their first position when operated by a stop outside the tool, substantially as described.

In testimony whereof I have signed this specification in the presence of two subscribing witnesses.

ALLEN JOHNSTON.

Witnesses:
J. T. HACKWORTH,
GEO. F. HALL.